(12) United States Patent
Konishi

(10) Patent No.: US 10,268,905 B2
(45) Date of Patent: Apr. 23, 2019

(54) PARKING ASSISTANCE APPARATUS

(71) Applicant: DENSO CORPORATION, Kariya, Aichi-pref. (JP)

(72) Inventor: Toshiyuki Konishi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/518,948

(22) PCT Filed: Oct. 13, 2015

(86) PCT No.: PCT/JP2015/005170
§ 371 (c)(1),
(2) Date: Apr. 13, 2017

(87) PCT Pub. No.: WO2016/067535
PCT Pub. Date: May 6, 2016

(65) Prior Publication Data
US 2017/0228605 A1    Aug. 10, 2017

(30) Foreign Application Priority Data
Oct. 29, 2014 (JP) ................. 2014-220326

(51) Int. Cl.
*G06K 9/00* (2006.01)
*B60R 1/00* (2006.01)
(Continued)

(52) U.S. Cl.
CPC .......... *G06K 9/00798* (2013.01); *B60K 35/00* (2013.01); *B60R 1/00* (2013.01);
(Continued)

(58) Field of Classification Search
None
See application file for complete search history.

(56) References Cited

U.S. PATENT DOCUMENTS

2002/0175832 A1* 11/2002 Mizusawa ............ B62D 15/028
340/932.2
2003/0076414 A1* 4/2003 Sato ........................ G01S 11/12
348/148
(Continued)

FOREIGN PATENT DOCUMENTS

EP        2653367 A2    10/2013
JP     2001199297 A     7/2001
(Continued)

*Primary Examiner* — Delomia L Gilliard
(74) *Attorney, Agent, or Firm* — Harness, Dickey & Pierce, P.L.C.

(57) ABSTRACT

A parking assistance apparatus mounted on a vehicle includes a display processor that displays an image on a right-side display disposed on a right side with respect to a driver, and displays an image on a left-side display disposed on a left side with respect to the driver located in the interior of the vehicle, and a calculator that recognizes boundary lines of a parking area located in the rear of the vehicle, and specifies a gap in a vehicle width direction between the vehicle and one of the boundary lines on each of the left side and the right side to determine a leftward off-center or a rightward off-center. The display processor displays a vehicle off-center image indicating a result determined by the calculator on each of the right-side display and the left-side display together with the image captured.

12 Claims, 16 Drawing Sheets

(51) Int. Cl.
  *B62D 15/02*   (2006.01)
  *H04N 7/18*    (2006.01)
  *B60K 35/00*   (2006.01)
  *H04N 5/232*   (2006.01)
  *H04N 5/247*   (2006.01)

(52) U.S. Cl.
  CPC ....... B62D 15/027 (2013.01); G06K 9/00812 (2013.01); H04N 5/23293 (2013.01); H04N 5/247 (2013.01); H04N 7/181 (2013.01); *B60K 2350/2013* (2013.01); *B60R 2300/30* (2013.01); *B60R 2300/806* (2013.01)

(56) References Cited

U.S. PATENT DOCUMENTS

| | | | |
|---|---|---|---|
| 2005/0240342 A1* | 10/2005 | Ishihara | B60R 1/00 701/1 |
| 2009/0121899 A1* | 5/2009 | Kakinami | B62D 15/027 340/932.2 |
| 2010/0321211 A1* | 12/2010 | Ko | G08G 1/163 340/932.2 |
| 2013/0166190 A1 | 6/2013 | Ikeda et al. | |
| 2017/0232890 A1* | 8/2017 | Lewis | B60Q 9/002 348/148 |

FOREIGN PATENT DOCUMENTS

| | | | | |
|---|---|---|---|---|
| JP | 2003189293 A | | 7/2003 | |
| JP | 2003259356 A | | 9/2003 | |
| JP | 2004064150 A | | 2/2004 | |
| JP | 2005309812 A | | 11/2005 | |
| JP | 2006260578 A | | 9/2006 | |
| JP | 2008080959 A | * | 4/2008 | |
| JP | 2008080959 A | | 4/2008 | |
| JP | 2008179253 A | | 8/2008 | |
| JP | 2008179253 A | * | 8/2008 | |
| JP | 2009055098 A | | 3/2009 | |
| JP | 2011006005 A | | 1/2011 | |
| JP | 2012066700 A | | 4/2012 | |
| JP | 2012116282 A | | 6/2012 | |
| JP | 2013220802 A | | 10/2013 | |
| JP | 2013220802 A | * | 10/2013 | ......... B62D 15/0285 |

\* cited by examiner

PARKING ASSISTANCE APPARATUS

CROSS-REFERENCE TO RELATED APPLICATIONS

This application is a U.S. National Phase Application under 35 U.S.C. 371 of International Application No. PCT/JP2015/005170 filed on Oct. 13, 2015 and published in Japanese as WO 2016/067535 A1 on May 6, 2016. This application is based on and claims the benefit of priority from Japanese Patent Application No. 2014-220326 filed on Oct. 29, 2014. The entire disclosures of all of the above applications are incorporated herein by reference.

TECHNICAL FIELD

The present disclosure relates to a parking assistance apparatus for a vehicle.

BACKGROUND ART

In technologies for assisting rearward parking of a vehicle, there have been known a technology that captures an image by using a camera provided on a vehicle rear part, and displays the captured image on a display provided in the interior of the vehicle (so-called back monitor), and a technology that synthesizes images captured by cameras provided on the front, rear, left, and right sides of a vehicle to obtain a bird's-eye view, and displays the bird's-eye view on a display provided in the interior of the vehicle (so-called top-view monitor). There has been further proposed a parking assistance apparatus that captures images (images corresponding to side mirrors) by using cameras provided on the left and right sides of a vehicle to obtain images on the rear side of the vehicle, and adds the captured images to the left and right parts of a bird's-eye view shown on a display provided in the interior of the vehicle (see Patent Literature 1).

The inventor of the present application has found the following regarding a parking assistance apparatus for a vehicle.

When a vehicle moves rearward for rearward parking by using a back monitor, a parking frame starts to deviate from a field of vision of a camera in accordance with entrance of the vehicle into the parking frame. In this case, visual recognition of a positional relationship between the parking frame and the vehicle through the back monitor may become difficult for a driver of the vehicle. A top view monitor allows recognition of the positional relationship between the vehicle and the parking frame even after entrance of the vehicle into the parking frame. However, the image obtained by the top view monitor is not an image practically captured from immediately above the vehicle, but a synthesis image obtained by converting the captured images. In this case, a blind spot, that is, an area not visually recognizable, may be produced. As apparent from above, the method using only the back monitor or the bird's-eye view may be insufficient for securing visual recognition of a state in the rear of the vehicle.

According to a configuration described in Patent Literature 1 described above, for example, images corresponding to side mirrors need to be checked as well as a bird's-eye view. The images corresponding to the side mirrors are separately displayed on left and right displays. In this case, the left and right images displayed on the respective displays need to be alternately checked multiple times to park the vehicle equally on both sides within the parking frame. This problem may similarly arise from ordinary side mirrors.

In particular, for an inexperienced driver or the like not accustomed to rearward parking, it is often difficult to park a vehicle equally on the left and right sides of the parking frame at one try while gazing the images corresponding to side mirrors or both the side mirrors. Accordingly, the driver may be required to retry parking.

PRIOR ART LITERATURES

Patent Literature

Patent Literature 1: JP 2012-66700 A

SUMMARY OF INVENTION

It is an object of the present disclosure to provide a parking assistance technology that facilitates parking of a vehicle within a parking frame equally on left and right sides of the parking frame while reducing labor of alternately checking left and right images corresponding to side mirrors.

A parking assistance apparatus mounted on a vehicle, according to one example of the present disclosure, includes a display processor that displays an image, which has been captured by a camera disposed in a right-side front of the vehicle and imaging a right-side rear of the vehicle, on a right-side display disposed on a right side with respect to a driver located in an interior of the vehicle, and displays an image, which has been captured by a camera disposed in a left-side front of the vehicle and imaging a left-side rear of the vehicle, on a left-side display disposed on a left side with respect to the driver located in the interior of the vehicle, and a calculator that recognizes boundary lines of a parking area located in a rear of the vehicle, and specifies a gap in a vehicle width direction between the vehicle and one of the boundary lines on each of the left side and the right side to determine a leftward off-center or a rightward off-center. The display processor displays a vehicle off-center image indicating a result determined by the calculator on each of the right-side display and the left-side display together with the image captured.

According to the configuration, leftward or rightward off-center of the vehicle is recognizable based on only checking of one of the left-side and right-side displays that display images corresponding to side mirrors. Accordingly, it may be possible to facilitate driving operation during rearward parking.

BRIEF DESCRIPTION OF DRAWINGS

The above and other aspects, features and advantages of the present disclosure will become more apparent from the following detailed description made with reference to the accompanying drawings. In the drawings.

DESCRIPTION OF EMBODIMENTS

An embodiment of the present disclosure presented by way of example will be hereinafter described with reference to the drawings.

1. Configuration

Figure 1:
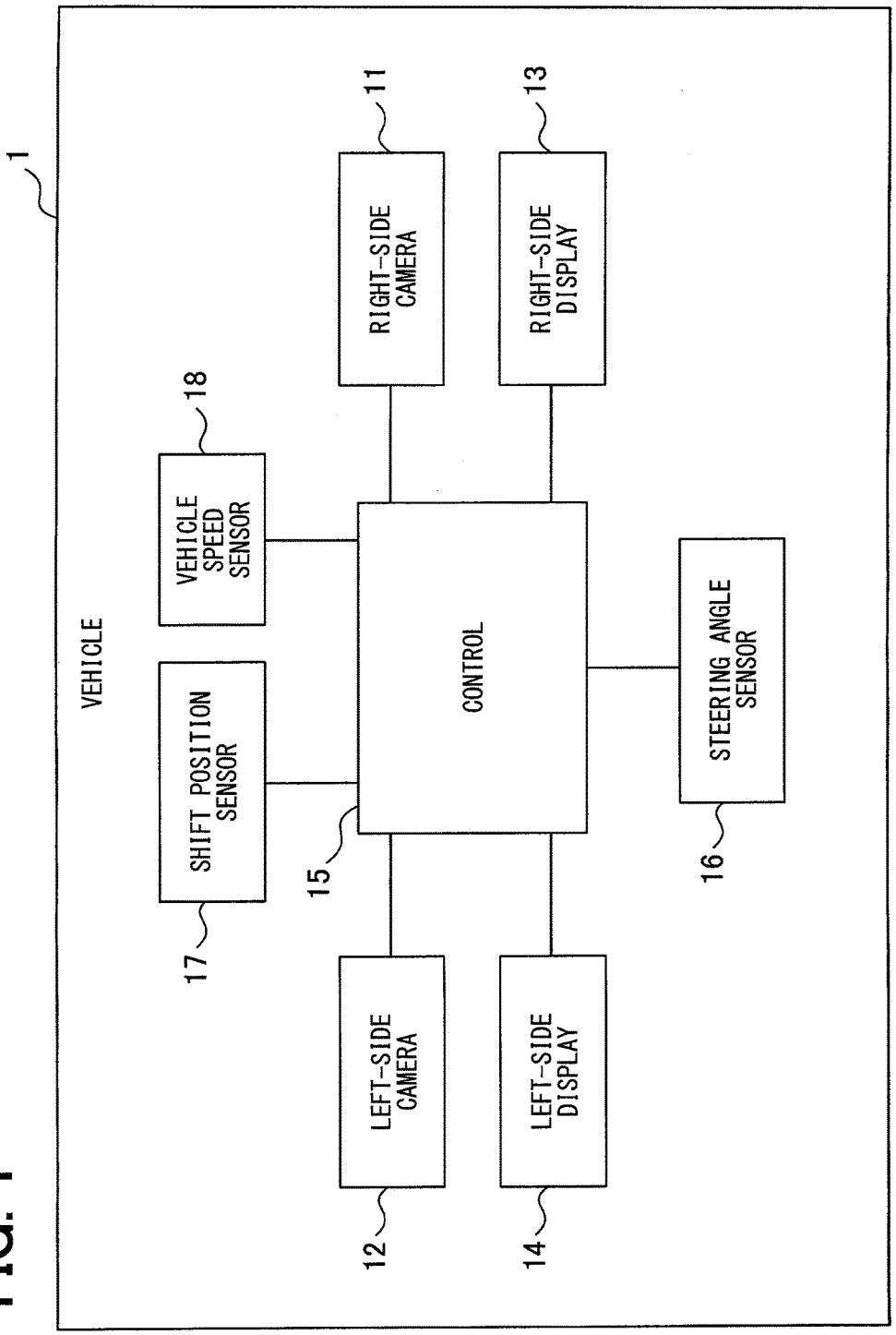
FIG. 1 is a block diagram illustrating a configuration of a vehicle.

A vehicle 1 illustrated in FIG. 1 includes a right-side camera 11, a left-side camera 12, a right-side display 13, a left-side display 14, a control computer 15, a steering angle sensor 16, a shift position sensor 17, and a vehicle speed sensor 18.

Figure 5:
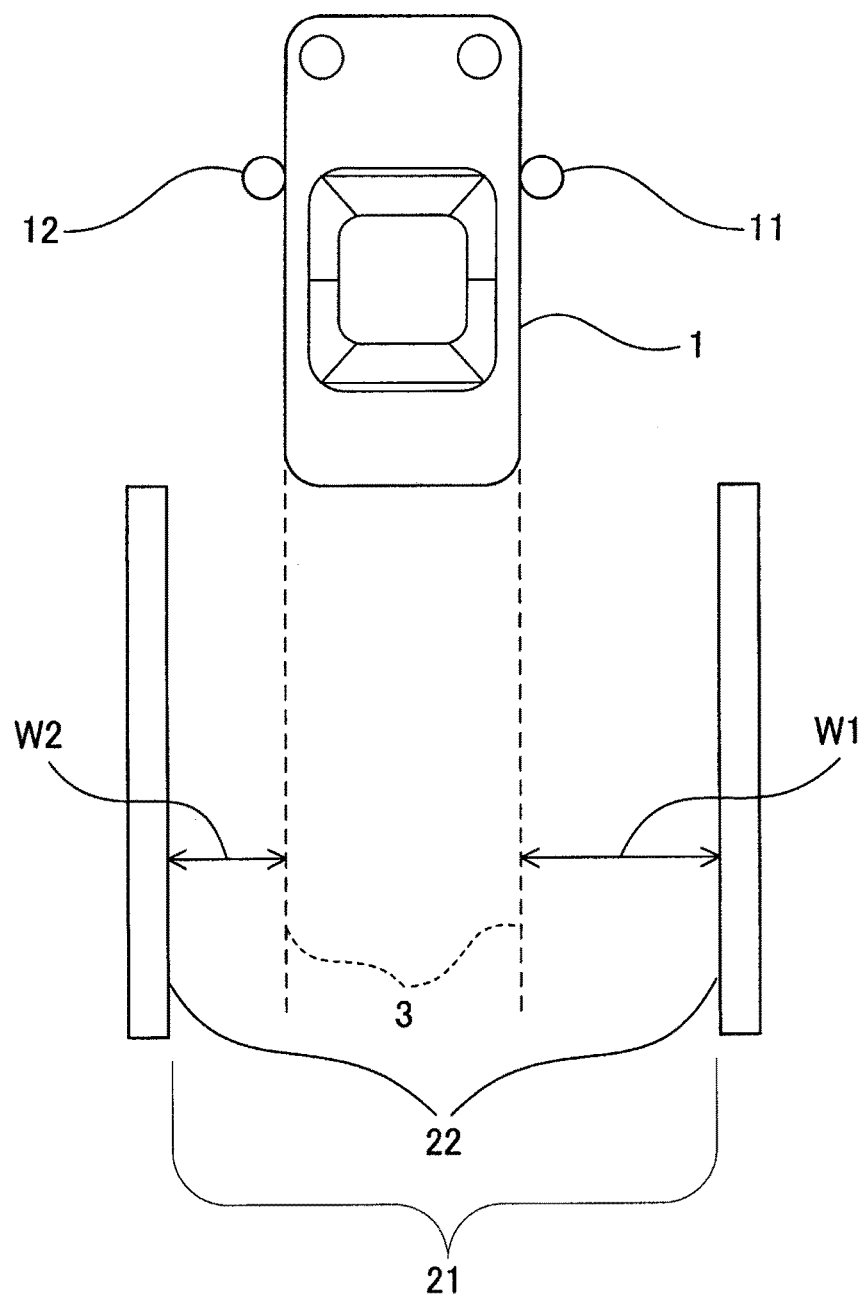
FIG. 5 is a view illustrating calculation of leftward or rightward off-center of the vehicle with respect to a parking frame.

The right-side camera 11 is disposed in a right-side front of the vehicle 1 to image a right-side rear of the vehicle 1. Similarly, the left-side camera 12 is disposed in a left-side front of the vehicle to image a left-side rear of the vehicle. The front in this context refers to a front with respect to a driver seat, for example. More specifically, as illustrated in FIG. 5 and other drawings, the right-side camera 11 is attached to a position around the front of a right-side front door of the vehicle 1, while the left-side camera 12 is attached to a position around the front of a left-side front door of the vehicle 1. However, the attachment positions of the right-side camera 11 and the left-side camera 12 are not limited to these positions presented only by way of example. The right-side camera 11 and the left-side camera 12 may be attached to pillars, fenders or the like on the right and left sides, respectively, for example. Each of the right-side camera 11 and the left-side camera 12 in the present embodiment is a wide-angle camera having a wide angle of view of approximately 180 degrees. The position around the front of the right-side front door of the vehicle 1 is an example position at which a right side mirror is generally disposed. The position around the front of the left-side front door of the vehicle 1 is an example position at which a left side mirror is generally disposed. The angle of view is also referred to as a viewing angle.

Figure 2:
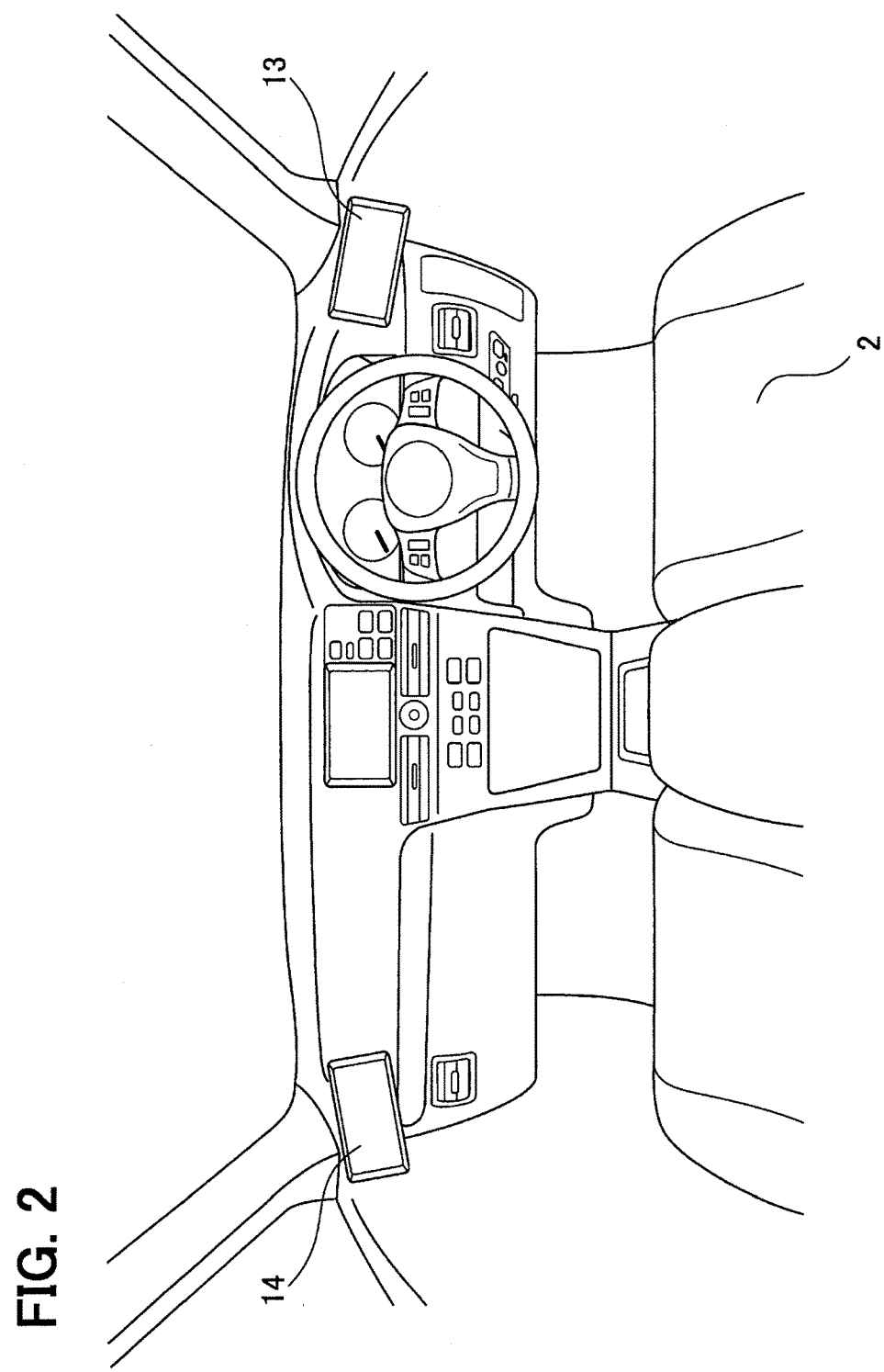
FIG. 2 is a view illustrating an example of a display layout.

As illustrated in FIG. 2, each of the right-side display 13 and the left-side display 14 is a display device that displays an image to be visually checked by a driver. The right-side display 13 is disposed on the right side with respect to the driver located on a driver seat 20 in the interior of the vehicle 1, while the left-side display 14 is disposed on the left side with respect to the driver located in the interior of the vehicle 1. According to the present embodiment, the right-side display 13 is disposed on the right side with respect to an instrument panel, while the left-side display 14 is disposed on the left side with respect to the instrument panel. The instrument panel in this context refers to a general term of equipment parts provided in a front region of the interior of the vehicle and containing respective meters, a glove box, and the like. However, the positions of the displays are not limited to these positions presented only by way of example. The respective displays may be disposed on the left and right pillars, for example. The right-side display 13 displays an image acquired by the right-side camera 11, while the left-side display 14 displays an image acquired by the left-side camera 12. Accordingly, the right-side display 13 and the left-side display 14 function as so-called electronic side mirrors.

The control computer 15 is a known electronic controller mainly configured by a microcomputer. The control computer 15 controls respective portions of the vehicle 1 to perform a parking assistance process described below. The control computer 15 may be a computer prepared exclusively for the parking assistance process, or may be a general computer capable of performing processes other than the parking assistance process as well as the parking assistance process.

The steering angle sensor 16 is a sensor that detects a steering angle of a steering of the vehicle 1, and outputs a signal to the control computer 15 in correspondence with an actual steering angle with respect to a reference steering angle at the time of straight traveling.

The shift position sensor 17 detects a shift position of the vehicle 1, and outputs a detection result to the control computer 15.

The vehicle speed sensor 18 detects a vehicle speed, and outputs a vehicle speed signal responsive to the detected vehicle speed to the control computer 15.

2. Outline of Parking Assistance Process

Figure 3:
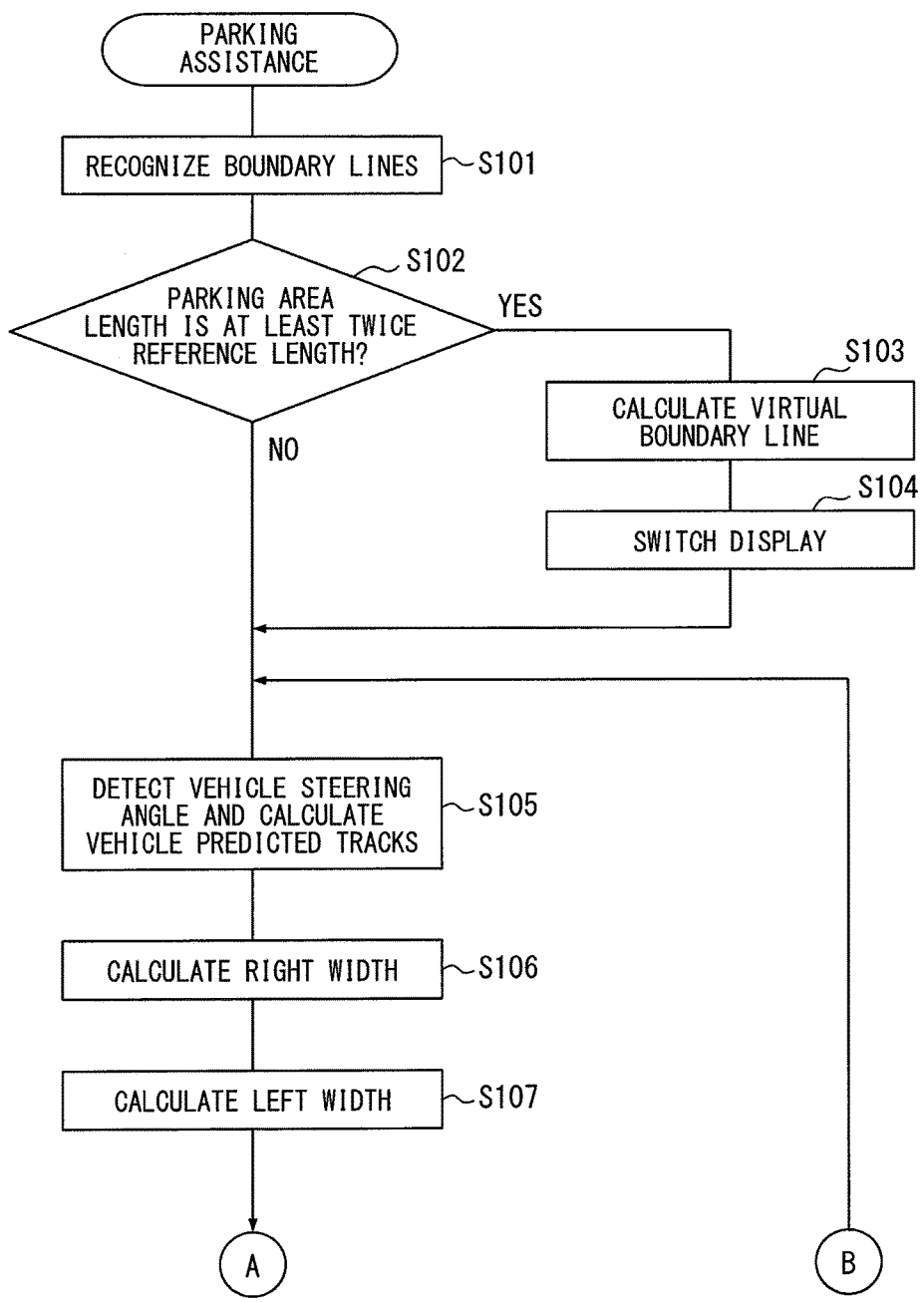
FIG. 3 is a part of a flowchart of a parking assistance process.
Figure 4:
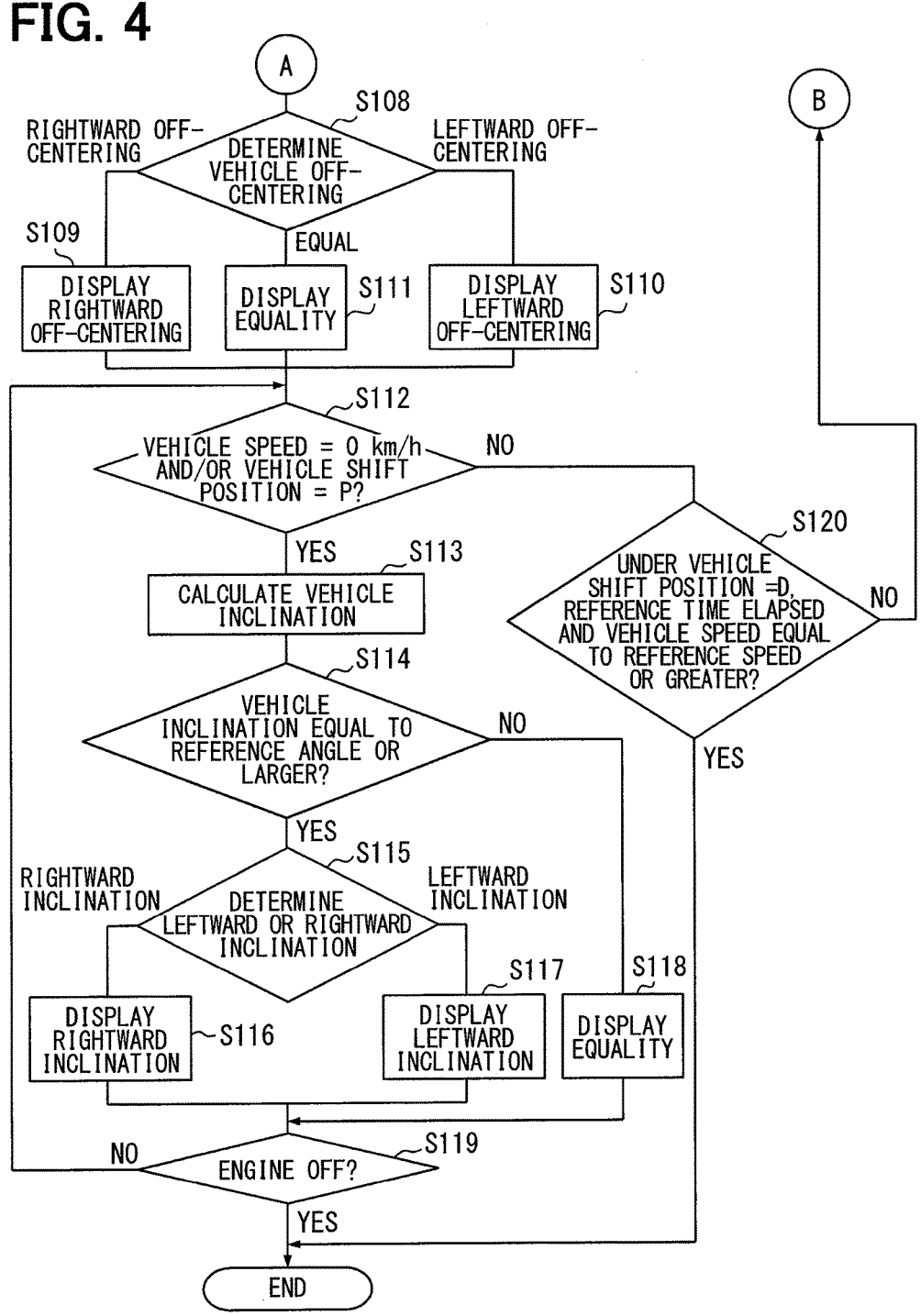
FIG. 4 is a part of the flowchart of the parking assistance process.

Next, an outline of the parking assistance process realized by the control computer 15 according to the present embodiment will be hereinafter described with reference to a flowchart shown in FIG. 3 and FIG. 4. The parking assistance process starts when the shift position sensor 17 detects a change of a shift lever position to R (reverse) by operation of the driver, and inputs detection information indicating the shift change to the control computer 15. The control computer 15 constantly displays an image captured by the right-side camera 11 on the right-side display 13, and an image captured by the left-side camera 12 on the left-side display 14 both before and after the start of the parking assistance process.

Initially, the control computer 15 recognizes, from images captured by the right-side camera 11 and the left-side camera 12, boundary lines that indicate boundaries of a parking area 21 located behind the vehicle 1 and corresponding to an area where the driver desires to park the vehicle, by using a known image processing technology (S101). The boundary lines correspond to boundaries in the vehicle width direction.

Figure 6:
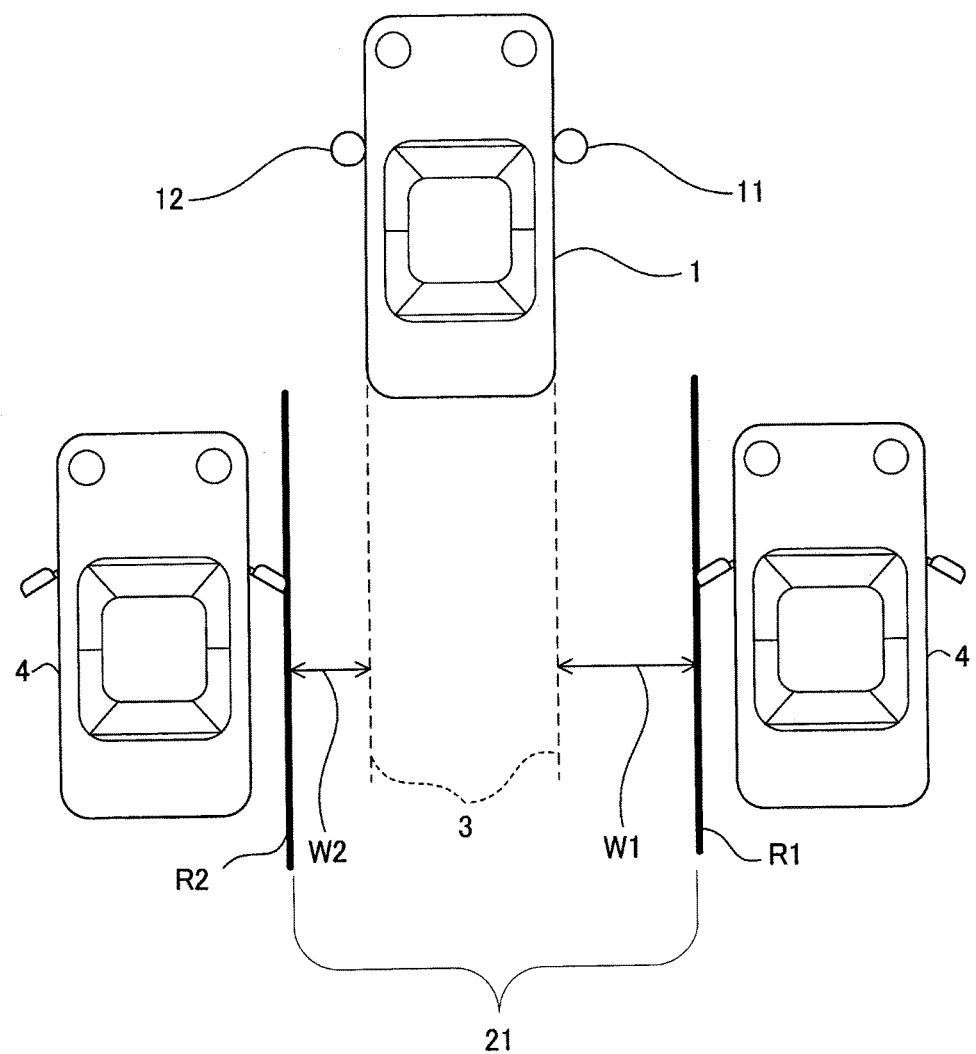
FIG. 6 is a view illustrating calculation of leftward or rightward off-center of the vehicle with respect to a different vehicle.

The boundary lines in this context corresponds to a parking frame 22 drawn as a sectioning frame of a parking lot as illustrated in FIG. 5, for example. As illustrated in FIG. 6, the control computer 15 also recognizes boundary lines corresponding to different vehicles 4 parked adjoiningly on the left and right sides in a state where the parking area 21 not specified by a parking frame is interposed between the boundary lines, for example. Each of the boundary lines corresponding to the different vehicles 4 is specified as a line extending in parallel with the front-rear direction of the corresponding different vehicle 4, and passing through a position at a vehicle-width distal end of the corresponding different vehicle 4. The respective parallel lines are indicated as lines R1 and R2 in the example illustrated in FIG. 6. It is assumed in the present embodiment that the position at the vehicle-width distal end in this context lies at a tip position of a side mirror of the corresponding different vehicle 4. A specific method for calculating the lines R1 and R2 will be described below. While the parking frame 22 and the lines R1 and R2 are recognized as boundary lines in the present embodiment, the boundary lines are not limited to these examples. For example, the control computer 15 may recognize boundary lines based on any obstacles other than the different vehicles 4, such as a garage, by utilizing known image processing.

Subsequently, the control computer 15 determines whether the length of the parking area 21 in the vehicle width direction (distance between two boundary lines) is at least twice a reference length, based on the boundary lines recognized in S101 (S102). The reference length in this context is an ordinary length of an area in the vehicle width direction as sectioned for one vehicle by a parking frame in a parking lot or the like. Accordingly, a length twice the reference length represents a length necessary for parking two ordinary vehicles.

When the recognized boundary lines are lines constituting the parking frame 22 as illustrated in FIG. 5, for example, since the parking frame 22 corresponds to a section defined for one vehicle in the parking lot, it is determined that the length of the parking area 21 in the vehicle width direction is less than twice the reference length (S102: NO).

In addition, when the recognized boundary lines are the lines R1 and R2 that have a space therebetween for less than two vehicles as illustrated in FIG. 6, for example, it is similarly determined that the length of the parking area 21 in the vehicle width direction is less than twice the reference length (S102: NO).

Figure 7:
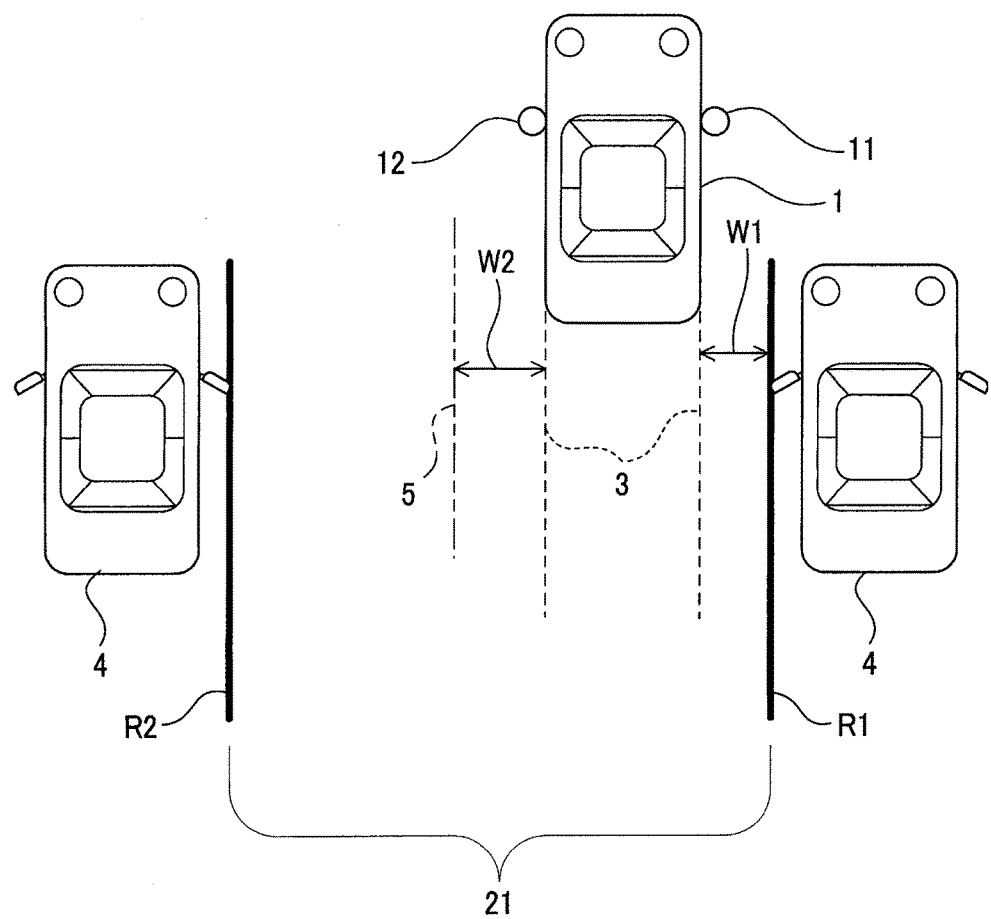
FIG. 7 is a view illustrating calculation of leftward or rightward off-center of the vehicle with respect to a virtual line.

On the other hand, when the recognized boundary lines are the lines R1 and R2 which have a space therebetween for two or more vehicles, as illustrated in FIG. 7, for example, it is determined that the length of the parking area 21 in the vehicle width direction is at least twice the reference length (S102: YES).

When determining that the length of the parking area 21 in the vehicle width direction is at least twice the reference length in S102 (S102: YES), the control computer 15 calculates a virtual line 5 that sections the parking area 21 (S103), and the process proceeds to S104. The virtual line 5 is a line that divides the length of the parking area 21 in the vehicle width direction (space between the line R1 and the line R2) into a plurality of equal parts, and handled as a boundary line in the following process. More specifically, when the length of the parking area 21 in the vehicle width direction is at least N times the reference length or less than (N+1) times the reference length, the (N−1) virtual line or lines 5 are calculated as a line or lines that divides the length of the parking area 21 in the vehicle width direction into N equal parts (N: two or larger integer). According to the example illustrated in FIG. 7, the length of the parking area 21 in the vehicle width direction is at least twice the reference length or less than three times the reference length. Accordingly, the one virtual line 5 is calculated as a line that divides the length of the parking area 21 in the vehicle width direction into two equal parts.

An example of the method for calculating the virtual line 5 will be described. Initially, a position of a vanishing point is specified in each of images captured by the right-side camera 11 and the left-side camera 12. The position of the vanishing point is obtained by detecting an optical flow based on a change of a captured image in accordance with movement of the vehicle 1, for example. However, each position of the vanishing points may be obtained by other methods, such as a method based on installation positions or imaging directions of the right-side camera 11 and the left-side camera 12. Subsequently, a three-dimensional shape of each of the different vehicles 4 in the captured image is estimated based on the position of the vanishing point. Thereafter, a position at the vehicle-width distal end of the corresponding vehicle 4, and a line parallel with the front-rear direction of the corresponding vehicle 4 are specified based on the estimated three-dimensional shape of the corresponding vehicle 4. The position at the vehicle-width distal end of the corresponding vehicle 4 is located at the tip end position of the side mirror in the present embodiment. A line that passes through a point located at the height of the ground and projected from the position at the vehicle-width distal end, and extends in parallel with the front-rear direction of the corresponding different vehicle 4 is calculated as the above-described line R1 or R2. Thereafter, the (N−1) virtual line or lines 5 are calculated as a line or lines that divide the length between the line R1 and R2 into N equal parts. The method for calculating each of the virtual lines 5 is not limited to the method presented only by way of example, but may be other methods. For example, each of the virtual lines 5 may be calculated based on the line R1 or R2 calculated with reference to a three-dimensional shape of an obstacle, such as the different vehicle 4, as a shape specified by using a laser sensor or the like.

Figure 17:
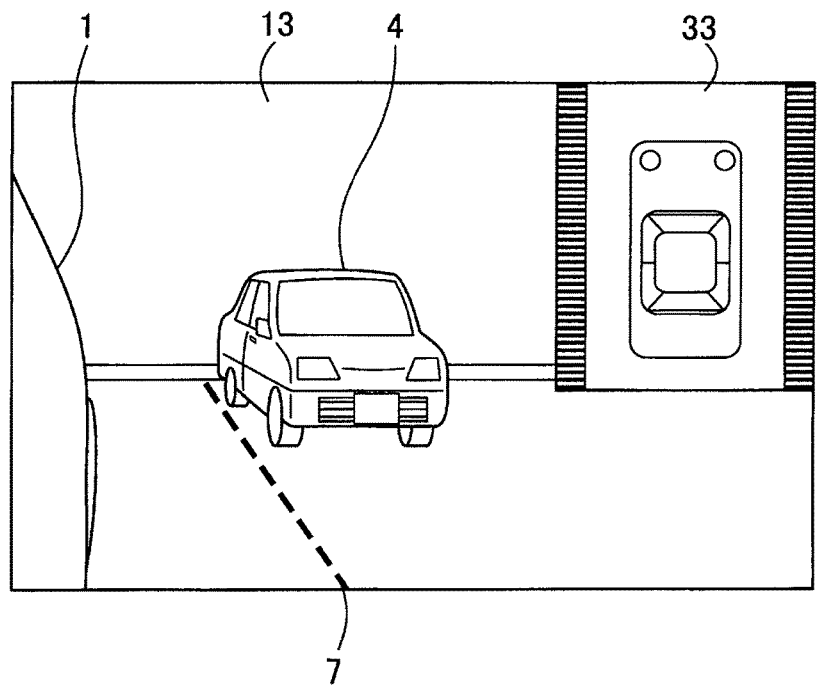
FIG. 17 is a view illustrating a display example of the right-side display in a state where the vehicle is located equally on the left and right sides with respect to the boundary lines corresponding to a different vehicle.

Subsequently, the control computer 15 selects the different vehicle 4 located at a longer distance from the vehicle 1, based on the above mentioned three-dimensional shapes of the different vehicles 4, from the different vehicles 4 parked adjoiningly on the left and right sides with the parking area 21 interposed between the different vehicles 4 as illustrated in FIG. 17. Thereafter, the control computer 15 selects the display positioned on the side of the different vehicle 4 selected as the farther vehicle 4 from the right-side display 13 and the left-side display 14, and switches the mode of the selected display to a wide range display mode (S104). The wide range display mode in this context is a mode of wide-angle zooming at a predetermined ratio by the right-side camera 11 or the left-side camera 12 determined as the wide range display mode to display a wider range of the captured image. The ratio of the wide-angle zooming by the right-side camera 11 or the left-side camera 12 is not limited to the predetermined ratio as described in the present embodiment. For example, the ratio of zooming may be a ratio for displaying the different vehicle 4 in the image. In other words, the ratio of wide-angle zooming may be changed in accordance with the position of the different vehicle 4 relative to the vehicle 1. Moreover, the display switched to the wide range display mode is not limited to either the right-side display 13 or the left-side display 14 as described in the present embodiment. For example, modes of both the right-side display 13 and the left-side display 14 may be switched to the wide range display mode. Furthermore, the method for displaying a wide range of the captured image is not limited to the method of wide-angle zooming by the right-side camera 11 and the left-side camera 12 as described in the present embodiment. For example, a wide range of the captured image may be displayed by expanding the widths of the right-side display 13 and the left-side display 14 (so-called wide display).

When determining that the length of the parking area 21 in the vehicle width direction is not at least twice the reference length in S102 (S102: NO), the control computer 15 shifts to S105 while skipping the process in S103.

Figure 8:
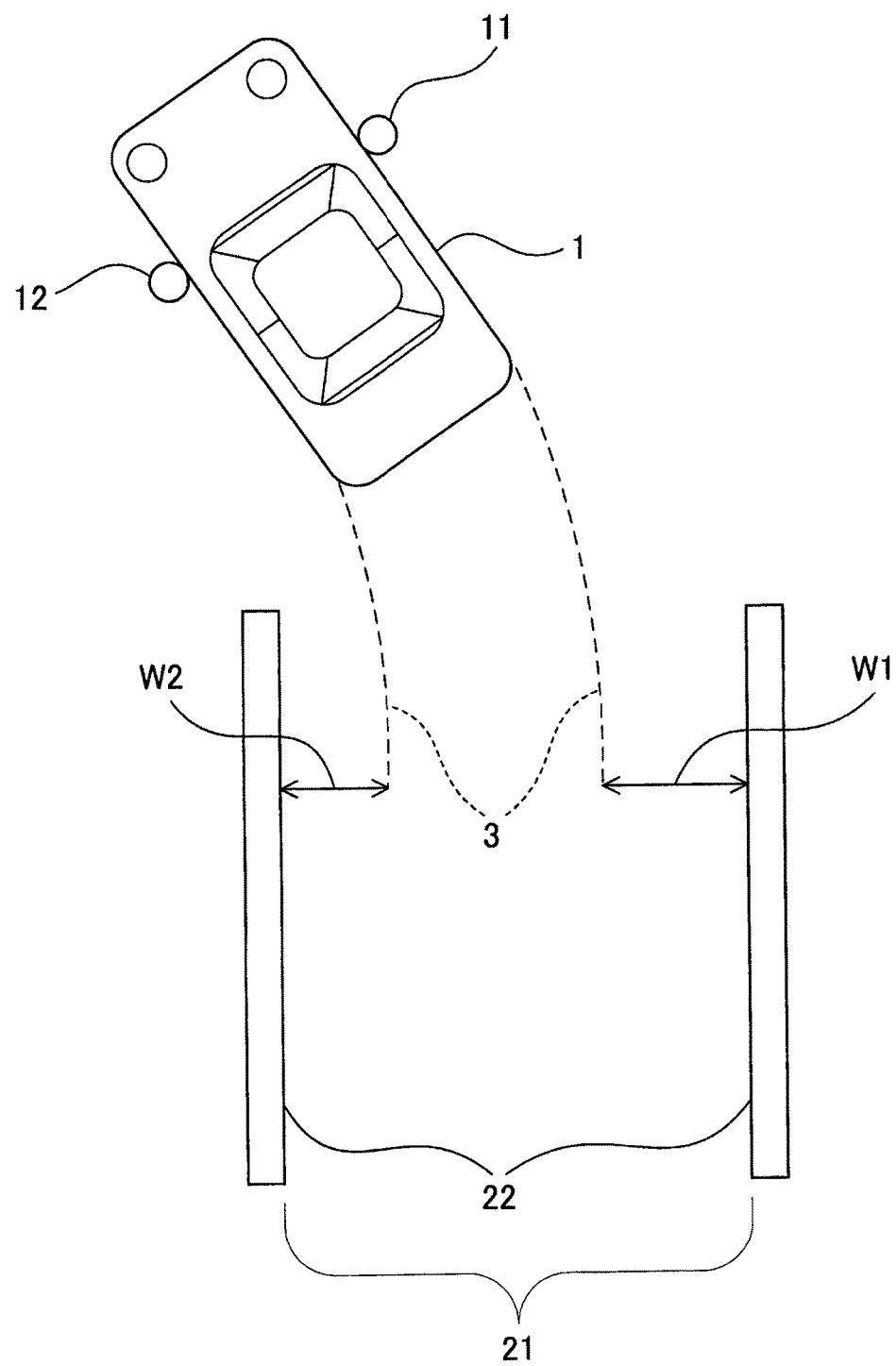
FIG. 8 is a view illustrating calculation of leftward or rightward off-center when the vehicle is not located in parallel with boundary lines.

In S105, the control computer 15 detects a steering angle of the vehicle 1 by using the steering angle sensor 16, and calculates predicted tracks 3 predicted based on the steering angle as illustrated in FIG. 8. The predicted tracks 3 may be produced based on signals from the steering angle sensor 16 and the vehicle speed sensor 18 by utilizing Ackermann-Jeantaud formula, for example.

Subsequently, the control computer 15 specifies gaps between the predicted tracks 3 and the boundary lines in the vehicle width direction on the left and right sides (gap W1 and gap W2) (S106, S107). The method for specifying the gaps is not particularly limited. For example, the gaps between the predicted tracks 3 and the boundary lines may be specified (number of pixels are counted, for example) in a synthesis image formed by adding the predicted tracks 3 and the boundary lines to the images captured by the right-side camera 11 and the left-side camera 12.

Thereafter, the control computer 15 determines leftward or rightward off-center of the vehicle 1 from the boundary lines (S108). More specifically, a difference between the gap W1 and the gap W2 specified in S106 and S107 is initially calculated. When the calculated difference lies out of an allowable range set beforehand, off-center is determined as rightward off-center in a state where the gap W1 is smaller than the gap W2, and as leftward off-center in a state where the gap W2 is smaller than the gap W1. When the difference falls within the allowable range, the gaps of the vehicle 1 with respect to the respective boundary lines are determined equal on the left side and the right side. The allowable range in this context is set to a range unnecessary for retry of parking in an off-center state of the vehicle 1 with respect to the boundary lines (small off-center range), such as a case when inconvenience for getting into and out of the vehicle is not produced.

Figure 14A:
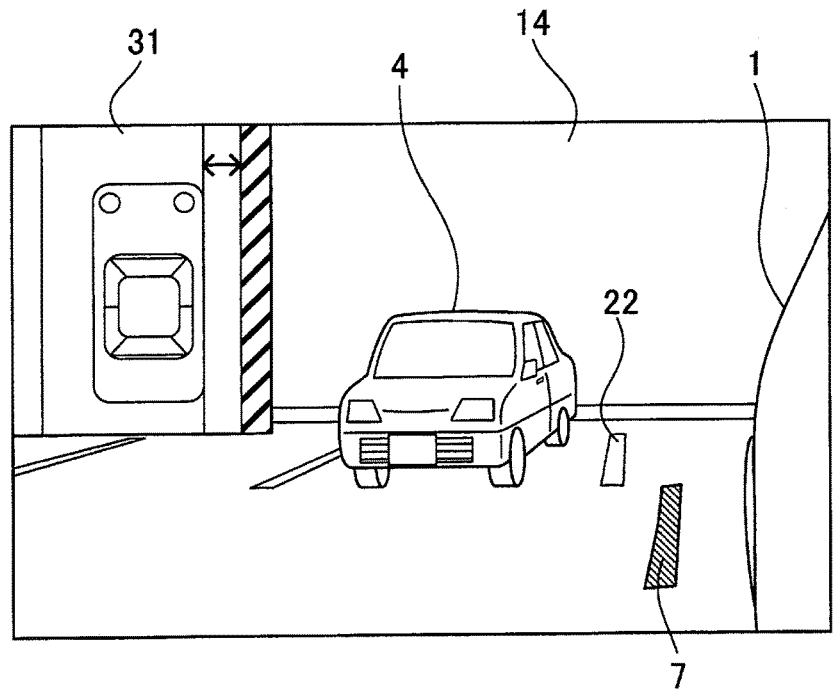
FIG. 14A is a view illustrating a display example of a left-side display in a rightward off-center state of the vehicle with respect to the parking frame.
Figure 14B:
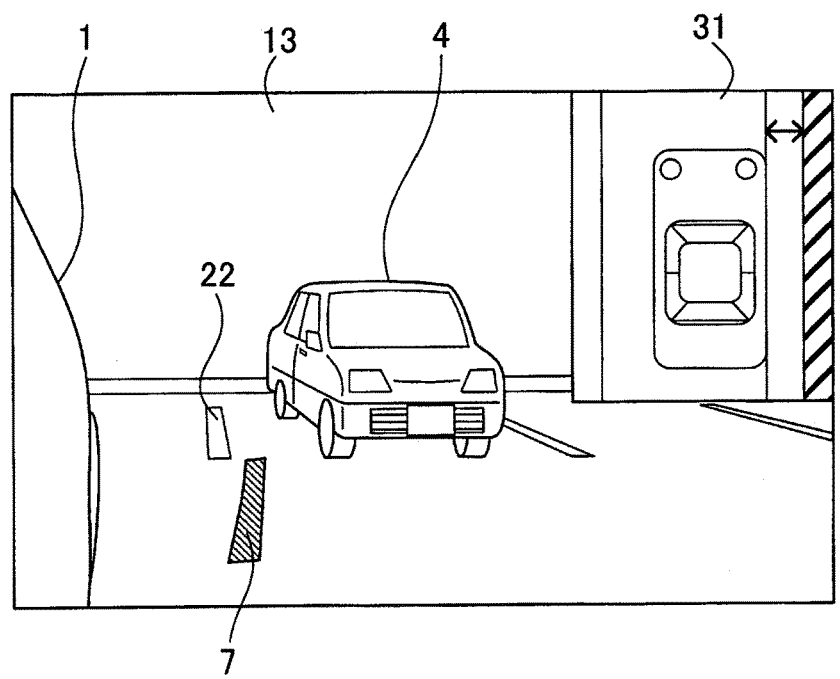
FIG. 14B is a view illustrating a display example of a right-side display in a rightward off-center state of the vehicle with respect to the parking frame.

When rightward off-center is determined (S108: rightward off-center), the control computer 15 displays a rightward off-center image 31 (FIG. 9) indicating the result of rightward off-center on the right-side display 13 and the left-side display 14 together with the images captured by the right-side camera 11 and the left-side camera 12 (S109) as illustrated in FIG. 14A and FIG. 14B.

Figure 15:
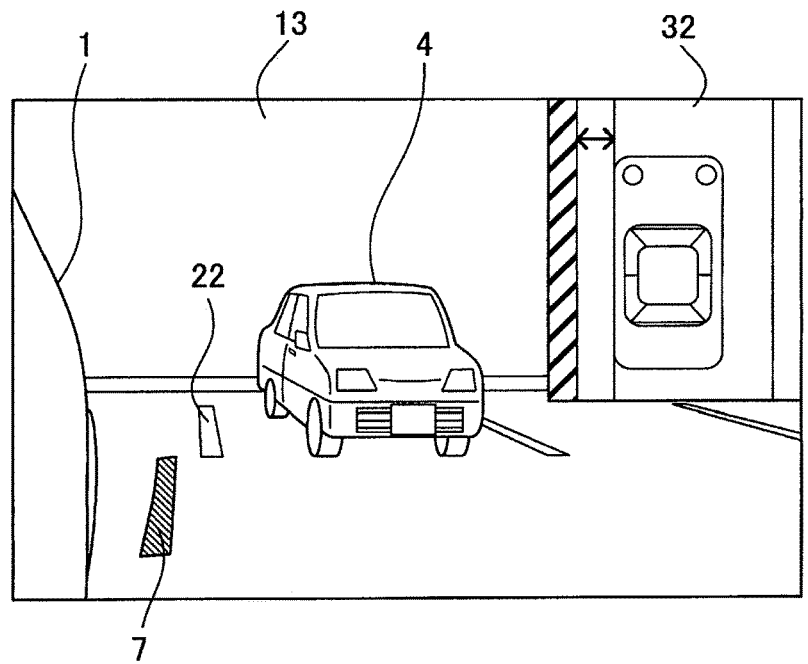
FIG. 15 is a view illustrating a display example of the right-side display in a leftward off-center state of the vehicle with respect to the parking frame.

When leftward off-center is determined (S108: leftward off-center), the control computer 15 displays a leftward off-center image 32 (FIG. 10) indicating the result of leftward off-center on the right-side display 13 and the left-side display 14 together with the images captured by the right-side camera 11 and the left-side camera 12 (S110). FIG. 15 illustrates a display example of the right-side display 13 in this case.

Figure 16:
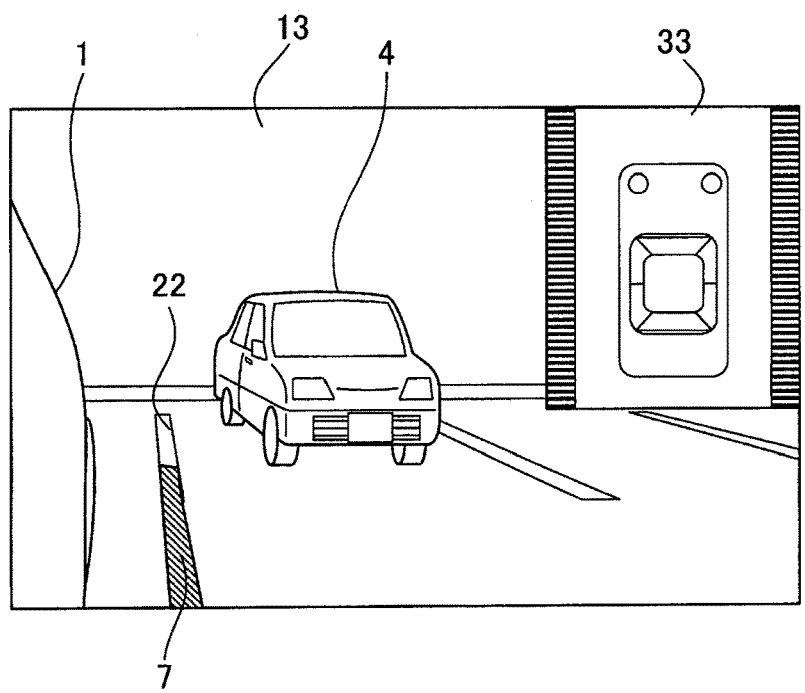
FIG. 16 is a view illustrating a display example of the right-side display in a state where the vehicle is located equally on the left and right sides with respect to the parking frame.

When the gaps W1 and W2 are determined as equal gaps (S108: equal), the control computer 15 displays an equal image 33 (FIG. 11) indicating the result of equality on the right-side display 13 and the left-side display 14 together with the images captured by the right-side camera 11 and the left-side camera 12 (S111). FIG. 16 illustrates a display example of the right-side display 13 in this case.

In S109 to S111, the control computer 15 displays the rightward off-center image 31, the leftward off-center image 32, or the equal image 33 on an upper right part of the image captured by the right-side camera 11 for the right-side display 13, and on an upper left part of the image captured by the left-side camera 12 for the left-side display 14 as overlapping images. According to this configuration example, the image is displayed on the upper right part of the right-side display 13 and the upper left part of the left-side display 14. However, the image may be displayed at other positions not overlapping with the vehicle body of the vehicle 1, for example.

In S109 to S111, the control computer 15 calculates a mark line 7 corresponding to a mark of leftward or rightward off-center of the vehicle 1 with respect to the boundary lines based on the boundary lines and the predicted tracks 3, and displays the calculated mark line 7 on the image captured by the right-side camera 11 for the right-side display 13, and on the image captured by the left-side camera 12 for the left-side display 14 as overlapping images.

According to the present embodiment, the mark line 7 is represented by a solid line and displayed in the following manner when the boundary lines are the parking frame 22. When rightward off-centering of the vehicle 1 is determined, the mark line 7 is displayed on the right side with respect to the parking frame 22 corresponding to the boundary lines as illustrated in FIG. 14A and FIG. 14B. When leftward off-center of the vehicle 1 is determined, the mark line 7 is displayed on the left side with respect to the parking frame 22 corresponding to the boundary lines as illustrated in FIG. 15, for example. When an equal state of the vehicle 1 on both sides is determined with respect to the boundary lines constituting the parking frame 22, the mark line 7 is displayed on a line identical to the center of the parking frame 22 in the vehicle width direction.

Figure 18:
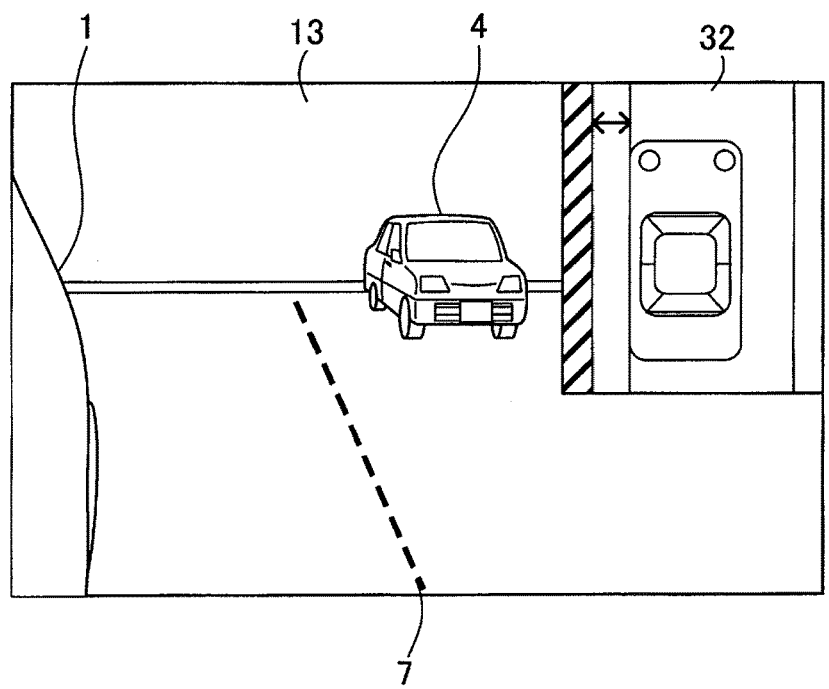
FIG. 18 is a view illustrating a display example of the right-side display in a leftward off-center state of the vehicle with respect to the boundary lines corresponding to the different vehicles.

When the boundary lines correspond to the different vehicles 4, the mark line 7 is indicated by a dotted line, and displayed in the following manner. When leftward off-center of the vehicle 1 is determined, the mark line 7 is displayed on the left side with respect to the boundary line corresponding to the different vehicle 4 (lines R1 and R2 in FIG. 6) as illustrated in FIG. 18. When rightward off-center of the vehicle 1 is determined, the mark line 7 is displayed on the right side with respect to the boundary line corresponding to the different vehicle 4. When an equal state of the vehicle 1 on both sides is determined as illustrated in FIG. 17, the mark line 7 is displayed on a line identical to the boundary line corresponding to the different vehicle 4. According to the present embodiment, the boundary lines corresponding to the different vehicles 4 are not displayed. However, the boundary lines corresponding to the different vehicles 4 may be displayed in addition to the mark line 7.

As illustrated in FIGS. 14A to 16, the control computer 15 may simultaneously display the mark line 7, and the rightward off-center image 31, the leftward off-center image 32, or the equal image 33, or may display only either the mark line 7 or one of the images 31 to 33. According to the present embodiment, the mark line 7 is indicated by a solid line for the boundary lines corresponding to the parking frame 22, and by a dotted line for the boundary lines corresponding to the different vehicles 4 so that the driver more easily distinguishes between the boundary lines of the parking frame 22 and the boundary lines of the different vehicles 4. However, the method of indication of the mark line 7 is not limited to the method. For example, the mark line 7 may be indicated by an identical line for both the cases of the parking frame 22 and the different vehicles 4.

Figure 9:
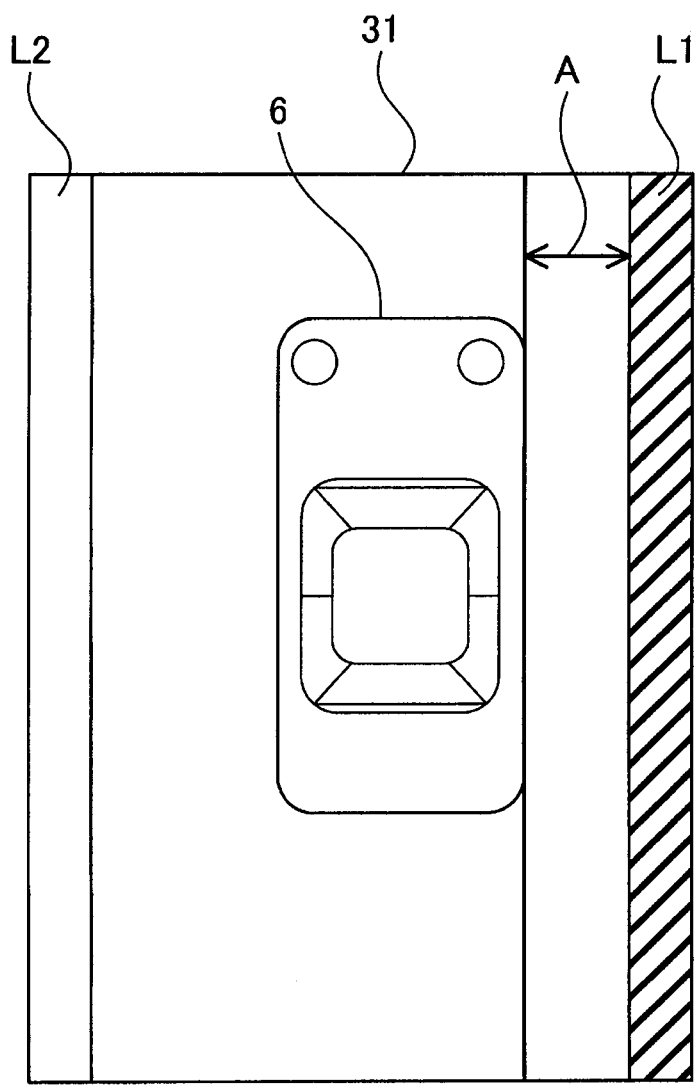
FIG. 9 is a view illustrating a display image to be displayed when the vehicle is in a rightward off-center state.
Figure 10:
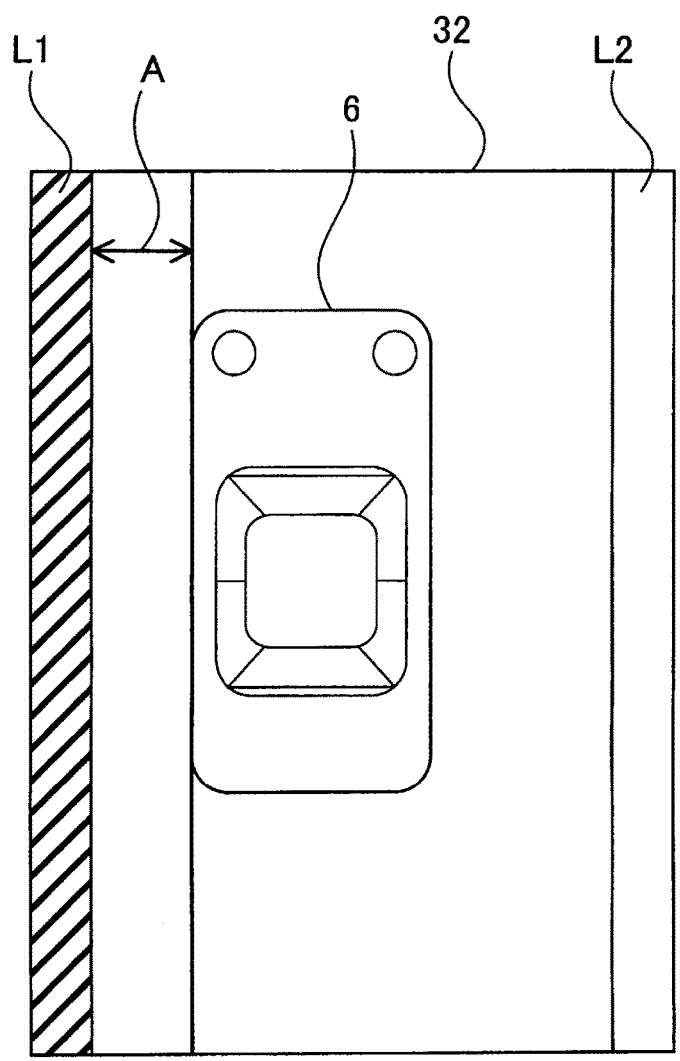
FIG. 10 is a view illustrating a display image to be displayed when the vehicle is a leftward off-center state.
Figure 11:
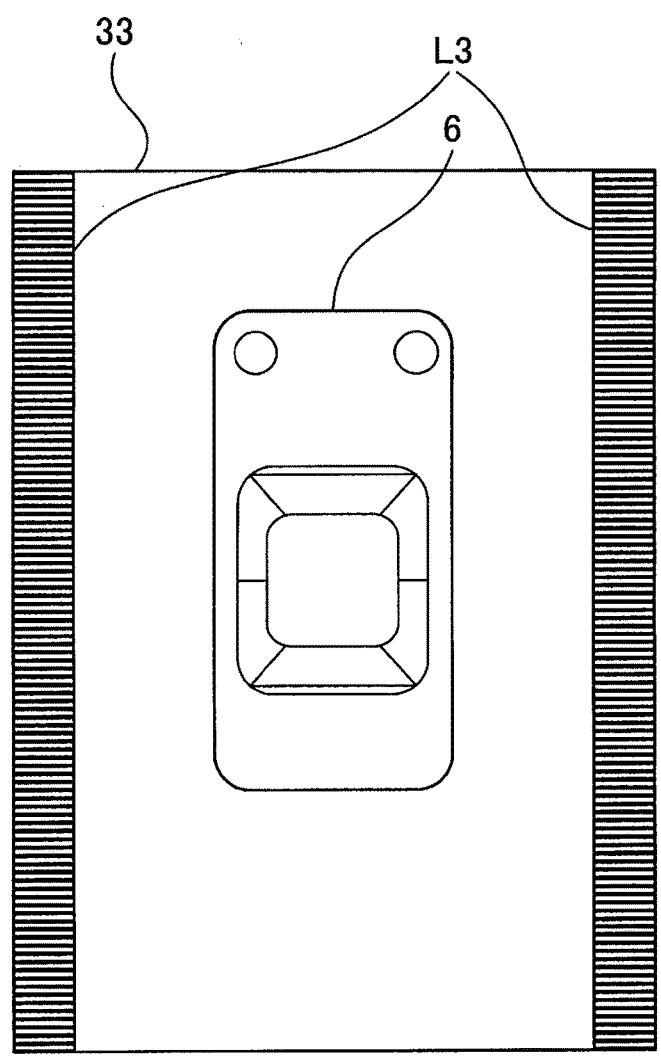
FIG. 11 is a view illustrating a display image to be displayed when the vehicle is equally located on left and right sides.

All of lines L1, L2, and L3 illustrated in FIGS. 9 to 11 represent boundary lines, and have different colors. For example, the lines L1, L2, and L3 are displayed in red, white, and green, respectively. The position of a vehicle icon 6 illustrated in each of the figures is variable in accordance with the off-center state of the vehicle 1. When rightward off-center of the vehicle 1 is determined with respect to the boundary lines as illustrated in FIG. 9, for example, the vehicle icon 6 shown in the image is in a rightward off-center state (toward line L1 side). When leftward off-center of the vehicle 1 is determined with respect to the boundary lines as illustrated in FIG. 10, for example, the vehicle icon 6 shown in the image is in a leftward off-center state (toward line L1 side) in the display of the image. An arrow A shown in each of FIG. 9 and FIG. 10 is displayed between the line L1 and the vehicle icon 6 to emphasize rightward or leftward off-center of the vehicle 1. When an equal state of the vehicle 1 on both sides is determined with respect to the boundary lines as illustrated in FIG. 11, the vehicle icon 6 is displayed between the two lines L3 at an equal distance from the lines L3 in the image. According to this display mode, the driver moving the vehicle rearward for parking easily recognizes the position of the vehicle 1 in the vehicle width direction only by glancing at the image.

Returning to FIG. 4, the control computer 15 determines whether the control computer 15 has received input of at least either detection information indicating a vehicle speed of 0 km/h from the vehicle speed sensor 18, or detection information indicating a shift lever position of P (parking) from the shift position sensor 17 (S112).

When determining that at least either the former detection information or the latter detection information has been received (S112: YES), the control computer 15 calculates inclination of the vehicle 1 with respect to the boundary lines (S113). The inclination of the vehicle 1 with respect to the boundary lines may be determined based on known image processing. For example, the inclination may be determined by a method that calculates a center line located at an equal distance from each of the recognized boundary lines, and determines an angle formed by the calculated center line and the center line of the vehicle 1 recognized beforehand.

Subsequently, the control computer 15 determines whether the degree of the inclination is a reference angle or more (S114). The reference angle in this context is a bordering angle of the inclination of the vehicle 1 with respect to the boundary lines at a border between a state necessary for retry of parking, such as a case producing inconvenience for getting into and out of the vehicle, and a state unnecessary for retry.

When determining that the degree of inclination is the reference angle or more (S114: YES), the control computer 15 determines that the vehicle 1 is inclined leftward or rightward (S115).

When determining that the vehicle 1 is inclined rightward (S115: rightward inclination), the control computer 15 displays a rightward inclination image 34 (FIG. 12) indicating the result of rightward inclination on each of the right-side display 13 and the left-side display 14 together with the images captured by the right-side camera 11 and the left-side camera 12 (S116).

When determining that the vehicle 1 is inclined leftward (S115: leftward inclination), the control computer 15 displays a leftward inclination image 35 (FIG. 13) indicating the result of leftward inclination on each of the right-side display 13 and the left-side display 14 together with the images captured by the right-side camera 11 and the left-side camera 12 (S117).

When determining that the determined inclination is smaller than the reference angle (S114: NO), the control computer 15 displays the equal image 33 (FIG. 11) indicating the result of a parallel state on each of the right-side display 13 and the left-side display 14 together with the images captured by the right-side camera 11 and the left-side camera 12 (S118).

Figure 12:
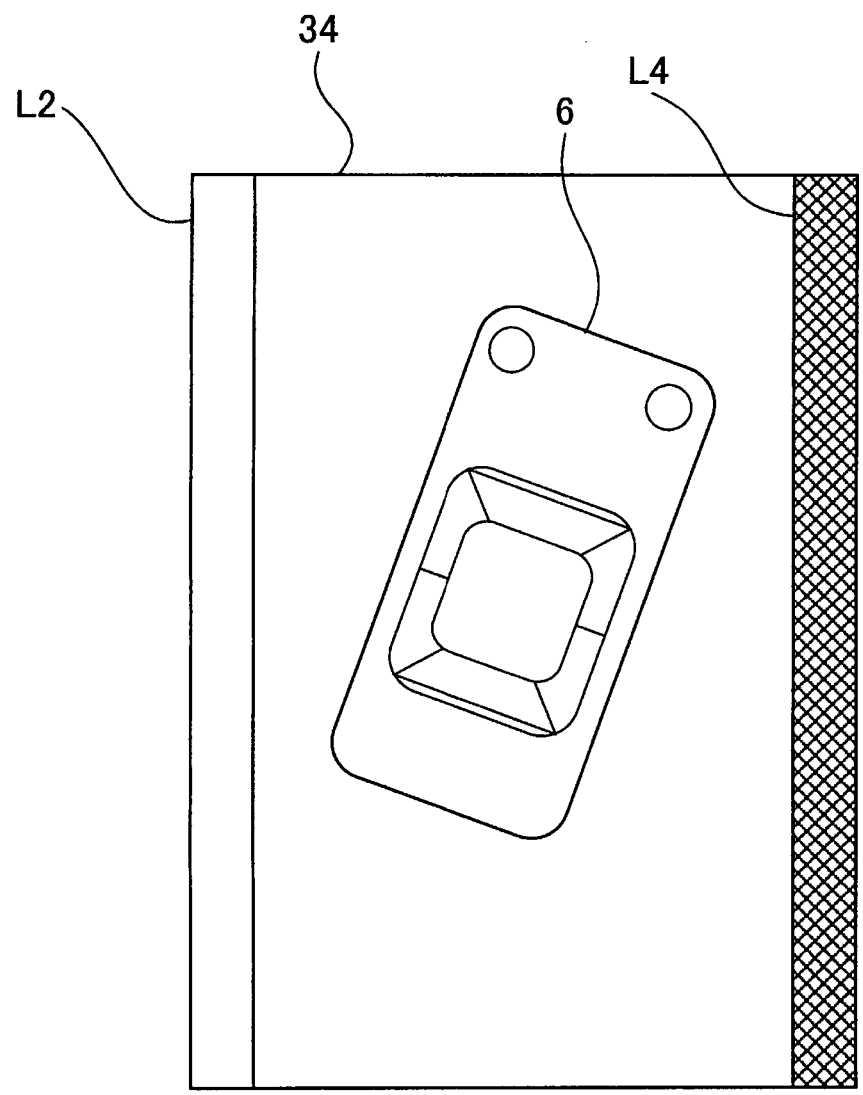
FIG. 12 is a view illustrating a display image to be displayed when the vehicle is in a rightward inclination state.
Figure 13:
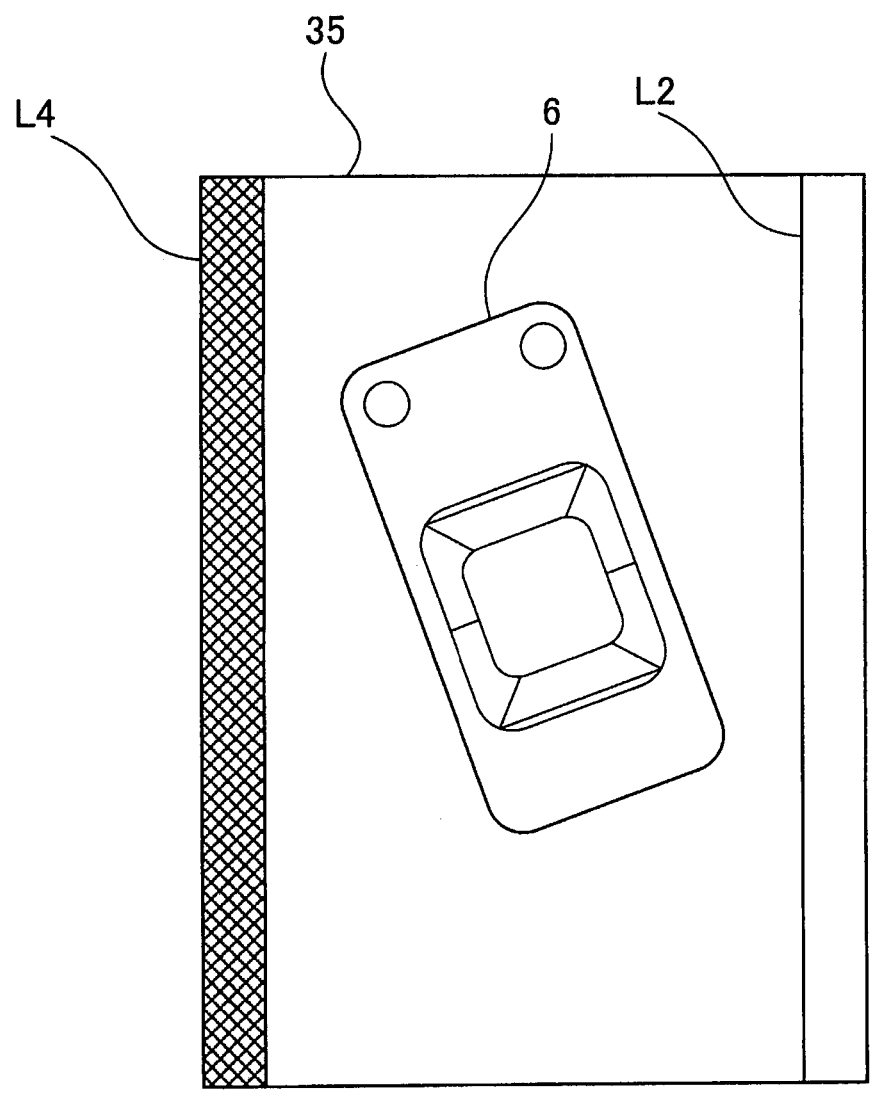
FIG. 13 is a view illustrating a display image to be displayed when the vehicle is a leftward inclination state.

A line L4 illustrated in FIG. 12 and FIG. 13 represents a boundary line similarly to the lines L1 to L3 described above. The line L4 is displayed in yellow, for example. When it is determined that the vehicle 1 is inclined rightward with respect to the boundary lines, the rightward inclination image 34 to be displayed contains the vehicle icon 6 inclined rightward (line L4 side) as illustrated in FIG. 12. When it is determined that the vehicle 1 is inclined leftward with respect to the boundary lines, the leftward inclination image 35 to be displayed contains the vehicle icon 6 inclined leftward (line L4 side) as illustrated in FIG. 13. According to this display mode, the driver easily recognizes the inclination of the vehicle 1 with respect to the boundary lines only by glancing at the image at the time of completion of parking.

Subsequently, the control computer 15 determines whether an engine of the vehicle 1 has been turned off (S119). When determining that the engine has been turned off (S119: YES), the control computer 15 ends the parking assistance process of the present embodiment. When determining that the engine has not been turned off yet (S119: NO), the control computer 15 returns the process to S112.

When determining in S112 that the control computer 15 has yet received neither the detection information indicating a vehicle speed of 0 km/h from the vehicle speed sensor 18, nor the detection information indicating a shift lever position of P (parking) from the shift position sensor 17 (S112: NO), the control computer 15 shifts the process to S120.

In S120, the control computer 15 determines whether a reference time set beforehand has elapsed from a change of the shift lever position to D (drive) by operation of the driver, and whether the vehicle speed is a reference speed set beforehand or higher. In other words, it is determined whether traveling has been shifted to normal traveling.

When determining that the reference time has not elapsed yet from the change of the shift lever position to D, or when determining that the vehicle speed is lower than the reference speed (S120: NO), the control computer 15 returns the process to S105. When determining that the reference time has elapsed from the change of the shift lever position to D, and that the vehicle speed is the reference speed or higher (S120: YES), the control computer 15 ends the parking assistance process.

3. Effects

According to the present embodiment detailed herein, the following advantageous effects are provided.

The control computer 15 displays one of the rightward off-center image 31 indicating rightward off-center of the vehicle 1, and the leftward off-center image 32 indicating leftward off-center of the vehicle 1, and the equal image 33 on each of the right-side display 13 and the left-side display 14 functioning as so-called electronic side mirrors together with captured images. Accordingly, the driver in the present embodiment is allowed to recognize leftward or rightward off-center of the vehicle 1 by checking either right-side display 13 or left-side display 14, thereby easily performing driving operation during rearward parking. More specifically, for recognizing leftward or rightward off-center of the vehicle 1 by using ordinary side mirrors during rearward parking, for example, alternate checking of the left and right side mirrors is required. According to the present embodiment, however, an image indicating leftward or rightward off-center (identical image) is displayed on each of the right-side display 13 and the left-side display 14 together with images corresponding to side mirrors. Accordingly, leftward or rightward off-center of the vehicle 1 is recognizable only by checking either one of the displays.

The control computer 15 recognizes the parking frame 22 sectioning a parking lot as boundary lines. Accordingly, the parking assistance process of the present embodiment is performable in a parking lot sectioned by the parking frame 22.

The control computer 15 recognizes, as boundary lines, lines (line R1 and R2) that pass through positions of vehicle-width distal ends of the side surfaces of the different vehicles 4 parked adjacent to the parking area 21, and extend in parallel with the front-rear directions of the different vehicles 4. Accordingly, the parking assistance process of the present embodiment is performable even in an area where the parking frame 22 is absent.

The control computer 15 calculates the virtual line 5 that sections the parking area 21 in the vehicle width direction when the length of the parking area 21 in the vehicle width direction is at least twice the reference length, and recognizes the virtual line 5 as a boundary line. Accordingly, the parking assistance process is performable in an appropriate manner for rearward parking of the vehicle 1 based on the calculated virtual line 5 sectioning the parking area 21 even when the parking area 21 contains a space for two or more vehicles.

When the length of the parking area 21 in the vehicle width direction is at least twice the reference length, the control computer 15 selects the display located on the side of the left or right different vehicle 4 at a longer distance from the vehicle 1, from the right-side display 13 and the left-side display 14, and switches the mode of the selected display to the wide range display mode. Accordingly, the driver parking the vehicle 1 rearward is allowed to more appropriately recognize the parking area 21 and the different vehicles 4 even when the parking area 21 contains a space for two or more vehicles.

The control computer 15 detects a steering angle of the vehicle 1 by using the steering angle sensor 16, and calculates the predicted tracks 3 in correspondence with the calculated steering angle. Accordingly, the control computer 15 is allowed to recognize the retreating direction of the vehicle 1.

The control computer 15 recognizes the boundary lines, and specifies the gap between the predicted track 3 and the boundary line in the vehicle width direction for each of the left and right sides to determine off-center on the left and right sides. Moreover, the control computer 15 displays the rightward off-center image 31, the leftward off-center image 32, or the equal image 33 indicating the determined result, on each of the right-side display 13 and the left-side display 14 together with images captured by the right-side camera 11 and the left-side camera 12. Accordingly, the parking assistance process capable of predicting the retreating direction of the vehicle can be performed.

The control computer 15 calculates the mark line 7 functioning as a mark of leftward or rightward off-center of the vehicle 1 with respect to the boundary lines based on the positional relationship between the boundary lines and the predicted tracks 3, and displays the calculated mark line 7 on each of the right-side display 13 and the left-side display 14 together with the rightward off-center image 31, the leftward off-center image 32, or the equal image 33. Accordingly, the driver recognizes leftward or rightward off-center of the vehicle 1 based on not only the rightward off-center image 31, the leftward off-center image 32, or the equal image 33, but also on the mark line 7 at the time of checking of the display.

After completion of parking, the control computer 15 determines inclination of the vehicle 1 with respect to the boundary lines, and displays the rightward inclination image 34, the leftward inclination image 35, or the equal image 33 indicating the determined result on each of the right-side display 13 and the left-side display 14 together with the images captured by the right-side camera 11 and the left-side camera 12. Accordingly, the driver easily recognizes inclination of the vehicle 1 at the time of completion of parking.

The control computer 15 displays the rightward off-center image 31, the leftward off-center image 32, the equal image 33, the rightward inclination image 34, or the leftward inclination image 35 on each of the right side (outside) of the right-side display 13 and the left side (outside) of the left-side display 14. Accordingly, the rightward off-center image 31, the leftward off-center image 32, or the like is displayed at a position not easily overlapping with the portion displaying the vehicle body of the vehicle 1 for each of the right-side display 13 and the left-side display 14.

According to the present embodiment, the control computer 15 corresponds to an example of a parking assistance apparatus, S101 to S108 and S112 to S115 correspond to an example of processes performed by a calculation portion, and S109 to S111 and S116 to S118 correspond to an example of processes performed by a display processor. The calculation portion is also referred to as a calculator. S102 corresponds to an example of a process performed by a length determination portion, S103 corresponds to an example of a process performed by a first calculation portion, S105 corresponds to an example of a process performed by a second calculation portion, and S106 to S108 correspond to an example of processes performed by an off-center determination portion. The rightward off-center image 31, the leftward off-center image 32, the equal image 33, and the mark line 7 correspond to an example of a vehicle off-center image. In addition, the equal image 33, the rightward inclination image 34, and the leftward inclination image 35 correspond to an example of a vehicle inclination image. The length determination portion is also referred to as a first determination portion, while the off-center determination portion is also referred to as a second determination portion.

4. Other Embodiments

Needless to say, the present disclosure is not limited to the embodiment described herein, but may be practiced in other various modes.

The structures of the right-side display 13 and the left-side display 14 in the above mentioned embodiment are not particularly limited. For example, the right-side display 13 and the left-side display 14 may be liquid crystal displays, organic EL displays, plasma displays or the like, or may be devices capable of displaying images on scenes viewed through a transparent material as overlapping images.

According to the above-described embodiment, the reference length is an ordinary length corresponding to one vehicle in the vehicle width direction as defined in a parking lot or the like. However, the reference length is not limited to this length. For example, the reference length may be configured to be directly input to the control computer 15 by the driver.

According to the above-described embodiment, the lines (lines R1 and R2 in the example in FIG. 6) extending in parallel with the front-rear directions of the different vehicles 4 pass through the vehicle-width distal ends located at the tip positions of the side mirrors of the different vehicles 4. However, other structures may be adopted. For example, the vehicle-width distal ends may be located on the side surfaces of the vehicle bodies of the different vehicles 4.

According to the above-described embodiment, the allowable range of the difference between the gap W1 and the gap W2 is set beforehand. However, other structures may be adopted. For example, the allowable range may be configured to be directly input to the control computer 15 by the driver.

According to the configuration of the above-described embodiment presented by way of example, the equal image 33 indicating an equal state as a result of determination is displayed on each of the right-side display 13 and the left-side display 14 when it is determined that the gap W1 and the gap W2 are equal. However, other configurations may be adopted. For example, adoptable as an alternative configuration is such a configuration that displays the rightward off-center image 31 or the leftward off-center image 32 only when rightward or leftward off-center is determined, and does not display the equal image 33 when equality between the gap W1 and the gap W2 is determined. Even in this configuration, the mark line 7 may be displayed in addition to the rightward off-center image 31 or the leftward off-center image 32 similarly to the above-described embodiment. Alternatively, the mark line 7 may be displayed instead of the rightward off-center image 31 or the leftward off-center image 32.

According to the configuration of the above-described embodiment presented by way of example, any one of the rightward off-center image 31, the leftward off-center image 32, and the equal image 33 illustrated in FIGS. 9 to 11 is displayed on the right-side display 13 and the left-side display 14. However, other configurations may be adopted. For example, an image corresponding to a retreating state of the vehicle 1 may be displayed instead of the rightward off-center image 31, the leftward off-center image 32, or the equal image 33. When the vehicle 1 is not located between the boundary lines at a start of rearward parking, for example, the vehicle icon 6 illustrated in FIGS. 9 to 11 may be displayed in the image above the area between the lines L1 and L2, or between the lines L3. When the vehicle 1 is located between the boundary lines, the vehicle icon 6 may be displayed in the image between the lines L1 and L2, or between the lines L3 as illustrated in FIGS. 9 to 11. In addition, an image positioning the vehicle icon 6 in a right part may be displayed at the time of rightward off-center of the vehicle 1 with respect to the boundary lines, while an image positioning the vehicle icon 6 in a left part may be displayed at the time of leftward off-center of the vehicle 1 with respect to the boundary lines, for example.

According to the above-described embodiment, the lines L1, L2, and L3 have different colors. However, other configurations may be adopted. For example, all of the lines may have an identical color, or distinction between the lines may be made such that the lines L1 and L2 have an identical color, and that the lines L3 have a different color.

According to the configuration of the above-described embodiment presented by way of example, the arrow A is displayed in the rightward off-center image 31 and the leftward off-center image 32. However, other configurations may be adopted. For example, display of the arrow A may be omitted.

According to the configuration of the above-described embodiment presented by way of example, the mark line 7 is displayed on the right-side display 13 and the left-side display 14 together with the rightward off-center image 31, the leftward off-center image 32, or the equal image 33. However, other configurations may be adopted. For example, display of the mark line 7 may be omitted, or the predicted tracks 3 may be displayed instead of the mark line 7. Alternatively, both the mark line 7 and the predicted tracks 3 may be displayed.

According to the configuration of the above-described embodiment presented by way of example, it is determined whether at least either detection information indicating a speed of 0 km/h of the vehicle 1, or detection information indicating a shift lever position of P (parking) of the vehicle 1 has been received from the vehicle speed sensor 18 or the shift position sensor 17. However, other configurations may be adopted. For example, the control computer 15 may be configured to determine only the detection information indicating a speed of 0 km/h, obtained by the vehicle speed sensor 18, of the vehicle 1. Alternatively, the control computer 15 may be configured to determine only the detection information indicating a shift lever position of P (parking) obtained by the shift position sensor 17, for example.

According to the configuration of the above-described embodiment presented by way of example, it is determined whether the degree of inclination of the vehicle 1 is the reference angle or more. However, other configurations may be adopted. For example, the reference angle may be configured to be directly input to the control computer 15 by the driver.

According to the above-described embodiment, the line L4 displayed in the rightward inclination image 34 and the leftward inclination image 35 of the vehicle 1 has a single color. However, the color of the line L4 is not required to be a single color. For example, the line L4 may have different colors for the rightward inclination image 34 and for the leftward inclination image 35.

According to the configuration of the above-described embodiment presented by way of example, the equal image 33, the rightward inclination image 34, or the leftward inclination image 35 indicating the determined result of inclination of the vehicle 1 is displayed on the right-side display 13 and the left-side display 14. However, other configurations may be adopted. For example, off-center may be simultaneously determined at the time of determination of inclination so that the rightward off-center image 31, the leftward off-center image 32, or the equal image 33 indicating the determined result is displayed together with the inclination image.

According to the configuration of the above-described embodiment presented by way of example, it is determined whether the reference time set beforehand has elapsed from a change of the shift lever position to D (drive) by operation of the driver, and whether the vehicle speed is the reference speed set beforehand or higher. However, other configurations may be adopted. For example, either one or both of the reference time and the reference speed may be configured to be directly input to the control computer 15 by the driver.

According to the above-described embodiment, the right-side display 13 and the left-side display 14 function as so-called electronic side mirrors. However, other configurations may be adopted. For example, the vehicle 1 may be configured to include ordinary side mirrors as well as the right-side display 13 and the left-side display 14 (electronic side mirrors).

A function performed by one constituent element in the above-described embodiment may be divided into functions performed by a plurality of constituent elements, or functions performed by a plurality of constituent elements may be unified into a function performed by one constituent element. A part of configurations of the above-described embodiment may be eliminated as long as problems are solved. At least a part of a configuration of the above-described embodiment may be added to or replaced with other configurations of the above-described embodiment.

The present disclosure may be practiced in various modes, such as a program executed by the control computer 15, a medium recording this program, and a vehicle control method.

It is noted that a flowchart or the process of the flowchart in the present application includes multiple steps (also referred to as sections), each of which is represented, for instance, as S101. Further, each step can be divided into several sub-steps while several steps can be combined into a single step.

While various embodiments, configurations, and aspects of parking assistance apparatus have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A parking assistance apparatus mounted on a vehicle, the parking assistance apparatus comprising:
    a right-side display that is disposed on a right side with respect to a driver located in an interior of the vehicle;
    a left-side display that is disposed on a left side with respect to the driver located in the interior of the vehicle, the left-side display being located remote from the right-side display;
    a display processor that
        displays an image, which has been captured by a camera disposed in a right-side front of the vehicle and imaging a right-side rear of the vehicle, on the right-side display, and
        displays an image, which has been captured by a camera disposed in a left-side front of the vehicle and imaging a left-side rear of the vehicle, on the left-side display; and
    a calculator that recognizes boundary lines of a parking area located in a rear of the vehicle, and specifies a gap in a vehicle width direction between the vehicle and one of the boundary lines on each of the left side and the right side to determine a leftward off-center or a rightward off-center, wherein:
    the display processor displays a vehicle off-center image indicating a result determined by the calculator on each of the right-side display and the left-side display together with the image captured;
    when the calculator determines that the vehicle is in a rightward off-center, the display processor displays as the vehicle off-center image, a rightward off-center image showing a result of determination by the calculator together with the image captured;
    when the calculator determines that the vehicle is in a leftward off-center, the display processor displays as the vehicle off-center image, a leftward off-center image showing the result of determination by the calculator together with the image captured;
    the rightward off-center image and the leftward off-center image each includes (i) a first line image showing a boundary line located at a right end of the vehicle off-center image, (ii) a second line image showing a boundary line located at a left end of the vehicle off-center image, and (iii) a vehicle icon showing the vehicle located between the first line image and the second line image;
    in the rightward off-center image, the vehicle icon is displayed in an off-center toward the first line image of the first line image and the second line image; and
    in the leftward off-center image, the vehicle icon is displayed in an off-center toward the second line image of the first line image and the second line image.

2. The parking assistance apparatus according to claim 1, wherein:
    the calculator recognizes a parking frame drawn in the parking area as the boundary lines.

3. The parking assistance apparatus according to claim 1, wherein:
    the calculator recognizes, as the boundary lines, lines extending in parallel with a front-rear direction of different vehicles parked adjoiningly on the left side and the right side with the parking area interposed between the different vehicles, and passing through positions at vehicle-width distal ends of side surfaces of the different vehicles.

4. The parking assistance apparatus according to claim 1, wherein:
    the calculator includes a computer configured to include:
        a length determination portion that determines whether a length of the parking area in the vehicle width direction is at least twice a reference length; and
        a first calculation portion that calculates a virtual line that sections the parking area in the vehicle width direction, and recognizes the virtual line as the boundary lines, when the length determination portion determines that the length of the parking area is at least twice the reference length.

5. The parking assistance apparatus according to claim 4, wherein:
    the calculator expands a range of a captured image to be displayed on at least one of the right-side display and the left-side display, when the length determination portion determines that the length of the parking area is at least twice the reference length.

6. The parking assistance apparatus according to claim 1, wherein:
the calculator includes a second calculation portion that calculates a predicted track of the vehicle by detecting a steering angle of the vehicle.

7. The parking assistance apparatus according to claim 6, wherein:
the calculator further includes an off-center determination portion that recognize the boundary lines, specifies a gap in the vehicle width direction between the predicted track calculated by the second calculation portion and the boundary lines for the left side and the right side, and determines a leftward off-center or a rightward off-center based on the gap specified; and
the display processor displays the vehicle off-center image indicating a result determined by the off-center determination portion on each of the right-side display and the left-side display together with the image captured.

8. The parking assistance apparatus according to claim 1, wherein:
the display processor displays a mark line indicating leftward or rightward off-center of the vehicle and corresponding to the vehicle off-center image based on a positional relationship between the mark line and the boundary lines recognized by the calculator.

9. The parking assistance apparatus according to claim 1, wherein:
the calculator determines inclination of the vehicle with respect to the boundary lines at a time of completion of parking; and
the display processor displays a vehicle inclination image indicating a result determined by the calculator on each of the right-side display and the left-side display together with the image captured.

10. The parking assistance apparatus according to claim 1, wherein:
the calculator includes a controller configured to include:
a length determination portion that determines whether a length of the parking area in the vehicle width direction is at least twice a reference length; and
a first calculation portion that calculates a virtual line that sections the parking area in the vehicle width direction, and recognizes the virtual line as the boundary lines, when the length determination portion determines that the length of the parking area is at least twice the reference length.

11. The parking assistance apparatus according to claim 1, wherein:
the rightward off-center image is an image highlighting the first line image; and
the leftward off-center image is an image highlighting the second line image.

12. The parking assistance apparatus according to claim 1, wherein:
the right-side display is positioned around a right A-pillar of the vehicle; and
the left-side display is positioned around a left A-pillar of the vehicle.

* * * * *